US012523693B2

(12) United States Patent
Yu (10) Patent No.: US 12,523,693 B2
(45) Date of Patent: Jan. 13, 2026

(54) ARC FAULT DETECTION APPARATUS, METHOD, DEVICE AND STORAGE MEDIUM

(71) Applicant: Fang Yu, Shanghai (CN)

(72) Inventor: Fang Yu, Shanghai (CN)

( * ) Notice: Subject to any disclaimer, the term of this patent is extended or adjusted under 35 U.S.C. 154(b) by 112 days.

(21) Appl. No.: 18/561,343

(22) PCT Filed: May 18, 2022

(86) PCT No.: PCT/CN2022/093490
§ 371 (c)(1),
(2) Date: Nov. 16, 2023

(87) PCT Pub. No.: WO2022/242668
PCT Pub. Date: Nov. 24, 2022

(65) Prior Publication Data
US 2024/0369611 A1 Nov. 7, 2024

(30) Foreign Application Priority Data
May 18, 2021 (CN) .......................... 202110542210.3

(51) Int. Cl.
*G01R 31/02* (2006.01)
*G01R 31/12* (2020.01)

(52) U.S. Cl.
CPC ..... *G01R 31/1227* (2013.01); *G01R 31/1209* (2013.01)

(58) Field of Classification Search
CPC ............ G01R 31/1209; G01R 31/1218; G01R 31/1227; G01R 31/1272; G01R 31/1245;
(Continued)

(56) References Cited

U.S. PATENT DOCUMENTS 5,513,002 A * 4/1996 Shapanus .............. G01J 1/0425
356/313
11,143,687 B2 * 10/2021 Manson ............ H02J 13/00002
(Continued)

FOREIGN PATENT DOCUMENTS

CN      108963962      * 12/2018
CN      111474451 A       7/2020
CN      112198401 A       1/2021

OTHER PUBLICATIONS

English Abstract of CN112198401A.
English Abstract of CN111474451A.

*Primary Examiner* — Thang X Le (57) ABSTRACT

An arc fault detection apparatus, a method, a device and a storage medium are provided. The arc fault detection apparatus detects electric energy characteristics of a power line to be detected by a power wave detection module, detects arc energy characteristics of the power line to be detected by an arc detection module, and uses a data processing module to determine whether the power line to be detected has a fault according to the electric energy characteristics, preset electric energy characteristics, the arc energy characteristics and preset arc energy characteristics, so as to achieve accurate arc measurement by means of electricity measurement and arc measurement, and further restore the arc fault characteristics more completely to eliminate the arc fault misjudgment rate and achieve accurate judgment to improve the accuracy and reliability of arc fault detection.

4 Claims, 3 Drawing Sheets

(58) Field of Classification Search
CPC ............ G01R 31/1254; G01R 31/1263; G01R 31/081; G01R 31/083; G01R 31/52; G01R 31/58; G01R 31/62
See application file for complete search history.

(56) References Cited

U.S. PATENT DOCUMENTS

| | | | |
|---|---|---|---|
| 2006/0209632 A1* | 9/2006 | Goodman | G01N 29/4427 367/13 |
| 2011/0057662 A1* | 3/2011 | Eriksson | H02H 7/055 324/536 |
| 2018/0074112 A1* | 3/2018 | Alberto | H02H 1/0023 |
| 2019/0052958 A1* | 2/2019 | Miller | G01R 31/1209 |
| 2020/0249268 A1* | 8/2020 | Wiedenbauer | G01R 31/327 |
| 2021/0333311 A1* | 10/2021 | Brainard, II | G08B 21/18 |

* cited by examiner

PRIOR ART

ARC FAULT DETECTION APPARATUS, METHOD, DEVICE AND STORAGE MEDIUM

This U.S. Non-Provisional Patent Application is a National Stage Application of the International Application PCT/CN2022/093490, which was filed on May 18, 2022, which in turn is based on the Chinese Patent Application No. 202110542210.3, filed at the China National Intellectual Property Administration on May 18, 2021, now granted as Chinese Patent 113125905 on Oct. 21, 2022, under the title "ARC FAULT DETECTION APPARATUS, METHOD, DEVICE AND STORAGE MEDIUM", the contents of which are hereby incorporated by reference in its entirety.

TECHNICAL FIELD

The present application relates to the electrical field, and in particular, to an arc fault detection apparatus, a method, a device and a storage medium.

BACKGROUND

According to the fire department statistics, arc fault is one of the main causes of electrical fire. In order to eliminate the electrical fire hazard of the arc fault, over the years, people have carried out continuous research and exploration of the mechanism of the arc fault, and have also successively introduced the standards of arc fault protection products.

The current arc fault detection methods of all product standards are carried out by detecting the power wave in the power line. That is, characteristics of the power wave in the power line caused by the occurrence of the arc fault are tracked and analyzed, and then whether the arc fault occurs is determined according to the preset arc fault simulation threshold.

Obviously, the existing power wave detection method of arc fault can only distinguish the power wave signal distortion caused by arc fault, and it is easy to misjudge the fault.

SUMMARY

The present application provides an arc fault detection apparatus, a method, a device and a storage medium to solve the problem that the existing detection methods cannot distinguish whether the power wave signal distortion in the power line is caused by arc fault or non-arc fault, and then the fault misjudgment is easy to occur.

In a first aspect, the present application provides an arc fault detection apparatus, including: a power wave detection module, an arc detection module and a data processing module;
  the power wave detection module is configured to detect electric energy characteristics of a power line to be detected, and the arc detection module is configured to detect arc energy characteristics of the power line to be detected;
  the data processing module is configured to determine whether the power line to be detected has a fault according to the electric energy characteristics, preset electric energy characteristics, the arc energy characteristics and preset arc energy characteristics.

In one possible design, the arc detection module includes: an electromagnetic wave detection module;
  the electromagnetic wave detection module is configured to detect electromagnetic wave characteristics of the power line to be detected, so that the data processing module determines whether the power line to be detected has a fault according to the electromagnetic wave characteristics and preset electromagnetic wave characteristics.

In one possible design, the electromagnetic wave detection module includes: an arc radio wave detection module;
  the arc radio wave detection module detects radio wave characteristics of the power line to be detected through an antenna, so that the data processing module determines whether the power line to be detected has a fault according to the arc radio wave characteristics and preset arc radio wave characteristics, the preset arc radio wave characteristics include preset arc radio wave spectrum characteristics, preset arc radio wave phase characteristics and preset arc radio wave amplitude characteristics.

In one possible design, the electromagnetic wave detection module includes: an arc light wave detection module;
  the arc light wave detection module detects arc light wave characteristics of the power line to be detected through a light wave sensor, so that the data processing module determines whether the power line to be detected has a fault according to the arc light wave characteristics and preset arc light wave characteristics, the preset arc light wave characteristics include preset arc light wave spectrum characteristics, preset arc light wave phase characteristics and preset arc light wave amplitude characteristics.

In one possible design, the arc detection module includes: a mechanical wave detection module;
  the mechanical wave detection module is configured to detect mechanical wave characteristics of the power line to be detected, so that the data processing module determines whether the power line to be detected has a fault according to the mechanical wave characteristics and preset mechanical wave characteristics.

In one possible design, the mechanical wave detection module includes: an arc ultrasonic wave detection module;
  the arc ultrasonic wave detection module detects arc ultrasonic wave characteristics of the power line to be detected through an ultrasonic sensor, so that the data processing module determines whether the power line to be detected has a fault according to the arc ultrasonic wave characteristics and preset arc ultrasonic wave characteristics, the preset arc ultrasonic wave characteristics include preset arc ultrasonic wave spectrum characteristics, preset arc ultrasonic wave phase characteristics and preset arc ultrasonic wave amplitude characteristics.

In one possible design, the mechanical wave detection module includes: an arc acoustic wave detection module;
  the arc acoustic wave detection module detects arc acoustic wave characteristics of the power line to be detected through an acoustic wave sensor, so that the data processing module determines whether the power line to be detected has a fault according to the arc acoustic wave characteristics and preset arc acoustic wave characteristics, the preset arc acoustic wave characteristics include preset arc acoustic wave spectrum characteristics, preset arc acoustic wave phase characteristics and preset arc acoustic wave amplitude characteristics.

In a second aspect, the present application also provides an arc fault detection method applied to the arc fault detection apparatus described in any one design of the first aspect, including:
  detecting electric energy characteristics and arc energy characteristics of a power line to be detected;

determining whether the power line to be detected has a fault according to the electric energy characteristics, preset electric energy characteristics, the arc energy characteristics and preset arc energy characteristics.

In a third aspect, the present application also provides an arc fault detection device, including: a memory and at least one processor;

the memory stores computer-executed instructions;

the at least one processor executes the computer-executed instructions stored in the memory to enable the at least one processor to execute the arc fault detection method described in the second aspect.

In a fourth aspect, the present application also provides a computer readable storage medium, the computer readable storage medium stores computer-executed instructions, and when the processor executes the computer-executed instructions, the arc fault detection method described in the second aspect is implemented.

In a fifth aspect, the present application also provides a computer program product, including a computer program, when the computer program is executed by a processor, the arc fault detection method described above in various possible designs of the second aspect is implement.

The arc fault detection apparatus, the method, the device and the storage medium provided in the present application detect the electric energy characteristics of the power line to be detected through the power wave detection module, detect the arc energy characteristics of the power line to be detected through the arc detection module, and determine whether the power line to be detected has a fault according to the electric energy characteristics, preset electric energy characteristics, arc energy characteristics and preset arc energy characteristics by means of the data processing module, so as to achieve accurate arc measurement by means of electricity measurement and arc measurement, and further restore the arc fault characteristics more completely to eliminate the arc fault misjudgment rate and achieve accurate judgment, thereby improving the accuracy and reliability of arc fault detection.

BRIEF DESCRIPTION OF DRAWINGS

The drawings herein are incorporated into and form part of the specification, show embodiments that comply with the present application, and are used together with the specification to explain the principle of the present application.

Specific embodiments of the present application have been shown by the drawings above and will be described in more detail later. These drawings and text descriptions are not intended in any way to limit the scope conceived by the present application, but rather to illustrate the concepts of the present application for those skilled in the art by reference to specific embodiments.

DESCRIPTION OF EMBODIMENTS

Illustrative embodiments will be illustrated in detail here, examples of which are shown in the attached drawings. Where the description below relates to drawings, the same numbers in different drawings represent the same or similar elements unless otherwise indicated. The embodiments described in the following illustrative embodiments do not represent all embodiments consistent with the present application. On the contrary, they are merely examples of devices and methods that are consistent with some aspects of the present application as detailed in the attached claims.

According to the fire department statistics, arc fault is one of the main causes of electrical fire, in order to eliminate the electrical fire hazard of the arc fault, over the years, people have carried out continuous research and exploration of the mechanism of the arc fault, and have also successively introduced the standards of arc fault protection products, such as: International publications UL11699-1999 Arc Fault Circuit Interrupter, UL1699B-2011 Photovoltaic DC Arc-Fault Detection Devices, IF (62606-2013 General Requirements for Arc Fault Detection Devices (AFDD)). In 2014, China also issued the national standards for the implementation of the corresponding products GB 14287.4-2014 Fault Arc Detector and GB T 31143-2014 General Requirements for Arc Fault Protection Electrical Appliances (AFDD)). The current arc fault detection methods of all product standards are carried out by detecting power waves in power lines.

Figure 1:
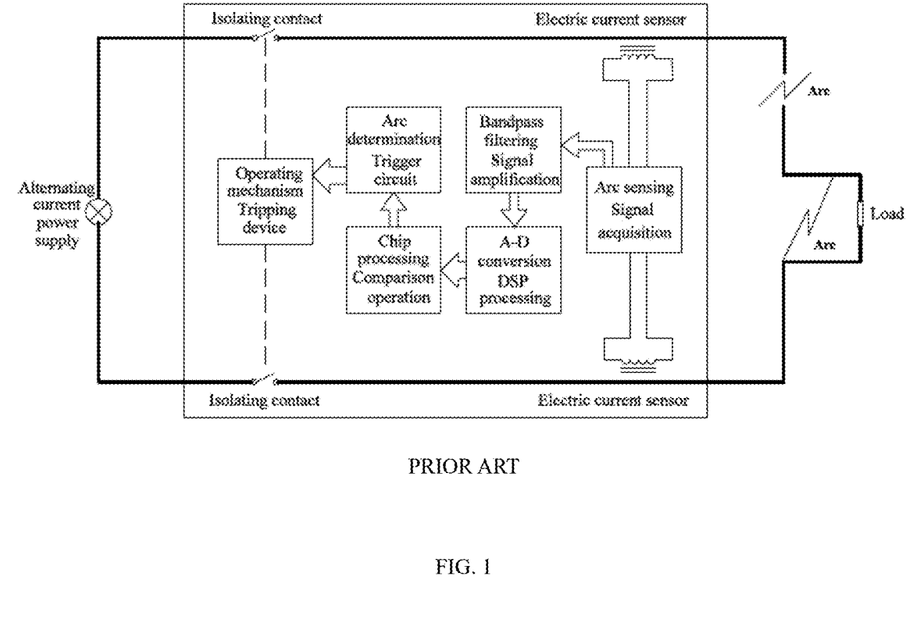
FIG. 1 is a schematic diagram of power wave detection technology described by existing arc fault detection standards.

FIG. 1 is a schematic diagram of power wave detection technology described by existing arc fault detection standards. As shown in FIG. 1, the arc fault detection method is to track and analyze the voltage, current, frequency (phase) or spectrum signals of the power wave in the power line caused by the arc fault. At the same time, Central Processing Unit (Central Processing Unit, CPU) software and hardware technology is used for sampling, calculation and processing. Then, according to a preset arc fault simulation threshold, whether arc fault occurs or not is determined. The above detection method can be called power wave detection method of arc fault, and all arc fault detection and protection products in current marketing and application are products under the above standards.

However, the above single power wave detection method has a fatal defect: it cannot distinguish whether the power wave signal distortion in the power line is caused by arc fault or non-arc fault (referred to as arc-like wave). Among them, for arc-like waves, from the point of view of power transmission, the normally transmitted power wave is alternating current 50/60 Hz sine wave, and when the arc fault occurs, the normal power wave will be distorted, and power wave distortion caused by the non-arc fault can be called arc-like wave.

In power lines, the occurrence of arc faults will cause power wave distortion, and in fact, and the reason of power wave distortion is not necessarily caused by a single arc fault, for example, the grid-connected and superimposed power waves generated by the Pulse Width Modulation (Pulse Width Modulation, PWM) technology adopted by photovoltaic, wind energy and other new energy sources will also bring instantaneous distortion to pure power frequency power waves in power lines and form arc-like waves. For another example, lightning and thunder in the sky will also bring instantaneous distortion to pure power frequency power waves in power lines and form arc-like waves. In another case, the frequent start-up and shutdown of high power capacitive inductive load in the same power line will also bring instantaneous distortion to the pure power frequency power wave in the power line and form arc-like waves and so on. Therefore, for the current arc fault protector products using a single power wave detection method, in practical applications, there will often be false alarm and false tripping phenomenon (not the cause of arc fault), which will cause great perplexity and trouble to the application of the product, resulting in users losing confidence in the actual use of such protection products. The reason is that the current single power wave detection method of arc fault has a theoretical deficiency, which is an insuperable primitive problem.

Specifically, the scientific basis and theoretical basis of the current single power wave detection method of the arc fault can be summarized by the following physical formula:

$$P_{arc} = P_{power\ wave\ energy}$$

However, because $P_{arc}=P_{power\ wave\ energy}+P_{arc\ energy}$, and $P_{arc}=P_{power\ wave\ energy}$, there are major theoretical deficiencies in the detection principle of the current single power wave detection method. In short, $P_{power\ wave\ energy}$ is measured, but $P_{arc\ energy}$ is not measured, and the arc is measured inaccurately.

In other words, only the power wave characteristics when the arc fault occurs is detected, including voltage, current, frequency (phase) or spectrum, and other characteristics such as sound, light and electricity when the arc fault occurs are not considered. It can be seen that the current power wave detection method (one-dimensional detection method) only realizes: the equivalent detection of $P_{arc}=P_{power\ wave\ energy}$, but ignores the existence and detection of $P_{arc\ energy}$ characteristics. The single power wave detection method only captures the electric energy characteristics of the arc fault, but does not capture all the characteristics of the arc fault, so the power wave detection method cannot describe the complete characteristics of the arc fault in a real and simulated way.

In addition, for the single power wave detection method, the detection technology used in the implementation can be specific: time domain analysis of power wave, frequency domain analysis of power wave, mathematical analysis of power wave, intelligent discrimination algorithm of power wave and so on. However, in summary, no matter what method, a single power wave detection cannot fully describe all the characteristics of the arc fault, that is, the physical phenomenon of the arc fault cannot be simulated and restored as a whole.

However, in the technical scheme of the present application, it is intended to provide an arc fault detection apparatus, a method, a device and a storage medium, through the arc fault five-dimensional detection method, the arc fault detection is developed into: power wave detection method, mechanical wave (sound wave and ultrasonic wave) detection method and electromagnetic wave (radio wave and light wave) detection method. The original one-dimensional detection method is extended to the five-dimensional detection method. Thus, the misjudgment rate of one-dimensional detection method is reduced, the misoperation is completely eliminated, and the market popularization and wide application of arc fault protection products are provided with a solid theoretical basis and reliable technical support.

Among them, the arc is an electrical glow discharge phenomenon that breaks down the insulating medium, usually accompanied by the local volatilization of the electrode, and the arc fault is usually a comprehensive physical phenomenon of sound, light and electricity appearing almost simultaneously. In this physical phenomenon, the electrical breakdown and glow discharge between the arc electrodes (including the electrode itself) caused by the power supply will naturally stimulate the propagation of arc mechanical waves (sound wave and ultrasonic wave) and the radiation of the arc electromagnetic wave (radio wave and light wave), the characteristics of arc mechanical waves (sound wave and ultrasonic wave) and arc electromagnetic wave (radio wave and light wave) are tracked and captured when arc occurs, which can be used as a supplementary basis for detecting whether arc fault occurs. Thus, the detection and verification of the characteristics of arc mechanical wave (sound wave and ultrasonic wave) and arc electromagnetic wave (radio wave and light wave) are superimposed based on the power wave detection method, which can improve the integrity, accuracy and reliability of arc fault detection and determination, thus providing a theoretical basis and scientific guarantee for the fundamental elimination of misjudgment and misoperation. This is the basic principle of the arc fault five-dimensional detection method applied to the arc fault detection apparatus provided in the present application.

Specifically, when arc fault occurs, according to the principle of conservation of energy, there is the following power relationship:

$$P_{arc} = _{electric\ energy\ (power\ wave\ energy)} + P_{arc\ energy}$$

Figure 2:
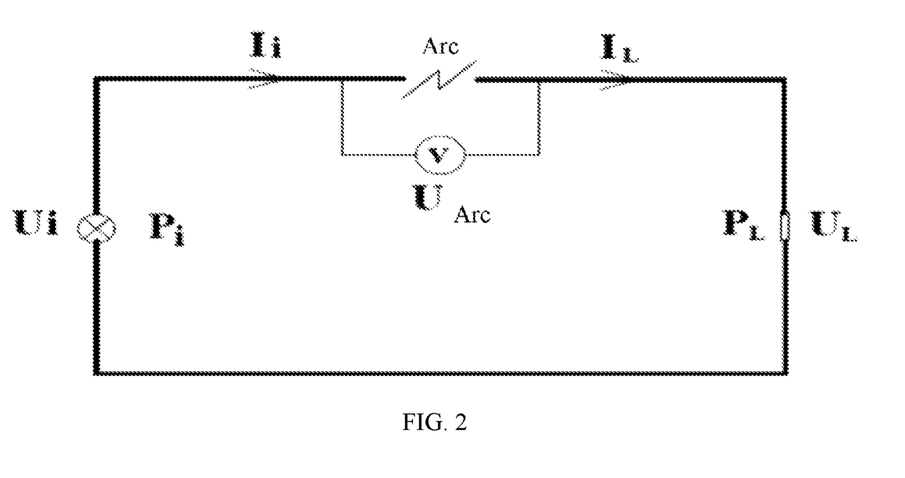
FIG. 2 is a detection schematic diagram of an arc fault detection apparatus provided by an embodiment of the present application.

According to Kirchhoff's law, the theoretical parameters of $P_{arc\ energy}$ can be derived. Among them, FIG. 2 is a detection schematic diagram of an arc fault detection apparatus provided by an embodiment of the present application. As shown in FIG. 2, the following derivation is performed:

(1). When the arc=0:

$I_L=Ii, U_L=Ui, \therefore P_L=Ii\cdot Ui=Pi;$ (2). When the arc≠0:

Let $I_L = X \cdot Ii$, $U_{arc} = Y \cdot Ui$, then $U_L = (1 - Y) \cdot Ui$;

$\because P_{electric\ energy} = I_L \cdot U_{arc} = X \cdot Ii \cdot Y \cdot Ui = X \cdot Y \cdot Pi$;

$P_L = I_L \cdot U_L = X \cdot Ii \cdot (1 - Y) \cdot Ui = X \cdot (1 - Y) \cdot Pi$;

$Pi = P_{arc} + P_L$; and $P_{arc} = P_{electric\ energy} + P_{arc\ energy}$ $\therefore Pi = P_{electric\ energy} + P_{arc\ energy} + P_L = X \cdot Y \cdot Pi + P_{arc\ energy} +$ $X \cdot (1 - Y) \cdot Pi$;

$Pi = X \cdot Y \cdot Pi + P_{arc\ energy} + X \cdot Pi - X \cdot Y \cdot Pi$ $\therefore P_{arc\ energy} = (1 - X) \cdot Pi$ According to this:
  A. When X=1 ($I_L$=Ii), $P_{arc\ energy}$=0, no arc is generated, and the circuit is in the normal power transmission state;
  B. When 0<X<1 ($I_L$≠Ii), $P_{arc}$ energy≠0, series arc occurs, and the circuit is in an abnormal power transmission state;
  C. when X=0 ($I_L$=0), $P_{arc\ energy}$≠0, parallel arc occurs, and the circuit is in a short circuit state.

It can be seen that when the arc occurs, the arc energy is generated synchronously, which obviously cannot be ignored. If the detection of arc energy in the arc fault is ignored, the characteristic detection of arc fault will be incomplete and partial. The defects of the current arc fault detection technology (one-dimensional detection method)

will result in the existence of high misjudgment rate and high misoperation phenomenon of commercially available products, which is inevitable.

According to the above theoretical analysis, the energy conservation formula when arc fault occurs can be expressed as follows:

$$P_{arc} = P_{power\ wave\ energy} + P_{acoustic\ energy} + P_{ultrasonic\ wave\ energy} +$$
$$P_{radio\ wave\ energy} + P_{light\ wave\ energy}$$

Correspondingly, the arc fault detection apparatus provided in the present embodiment includes: a power wave detection module, an arc detection module and a data processing module, in which the power wave detection module is configured to detect electric energy characteristics of a power line to be detected, and the arc detection module is configured to detect arc energy characteristics of the power line to be detected, and the data processing module is configured to determine whether the power line to be detected has a fault according to the electric energy characteristics, preset electric energy characteristics, the arc energy characteristics and preset arc energy characteristics. Among them, the power wave detection module is configured to detect $P_{power\ wave\ energy}$, and the arc detection module is configured to detect any one or any combination of $P_{acoustic\ energy}$, $P_{ultrasonic\ wave\ energy}$, $P_{radio\ wave\ energy}$, and $P_{light\ wave\ energy}$.

In addition, the preset electric energy characteristics can be obtained by the way of pre-test analysis. Specifically, it can include the spectrum characteristics, phase characteristics and amplitude characteristics corresponding to the electric energy characteristics when arc fault occurs. The preset arc energy characteristics can be obtained by the way of pre-test analysis. Specifically, it can include the spectrum characteristics, phase characteristics and amplitude characteristics corresponding to the characteristics when arc fault occurs.

If the matching degree between the electric energy characteristics and the preset electric energy characteristics, as well as the arc energy characteristics and the preset arc energy characteristics can reach a certain threshold through the data processing module, it can be determined that the arc fault occurs in the power line to be detected. If the matching degree cannot reach a certain threshold, it can be determined that the fault does not occur in the power line to be detected.

In this embodiment, the electric energy characteristics of the power line to be detected through the power wave detection module are detected and the arc energy characteristics of the power line to be detected are detected through the arc detection module. In addition, whether the power line to be detected has a fault is determined by the data processing module according to the electric energy characteristics, preset electric energy characteristics, arc energy characteristics and preset arc energy characteristics, so as to achieve accurate arc measurement by means of electricity measurement and arc measurement, and further restore the arc fault characteristics more completely to eliminate the arc fault misjudgment rate and achieve accurate judgment to improve the accuracy and reliability of arc fault detection.

On the basis of the above embodiments, the above arc detection module includes: an electromagnetic wave detection module. Among them, the electromagnetic wave detection module is configured to detect electromagnetic wave characteristics of the power line to be detected, so that the data processing module can determine whether the power line to be detected has a fault according to the electromagnetic wave characteristics and preset electromagnetic wave characteristics.

Optionally, the above arc detection module can further include: a mechanical wave detection module; the mechanical wave detection module is configured to detect mechanical wave characteristics of the power line to be detected, so that the data processing module can determine whether the power line to be detected has a fault according to the mechanical wave characteristics and preset mechanical wave characteristics.

Figure 3:
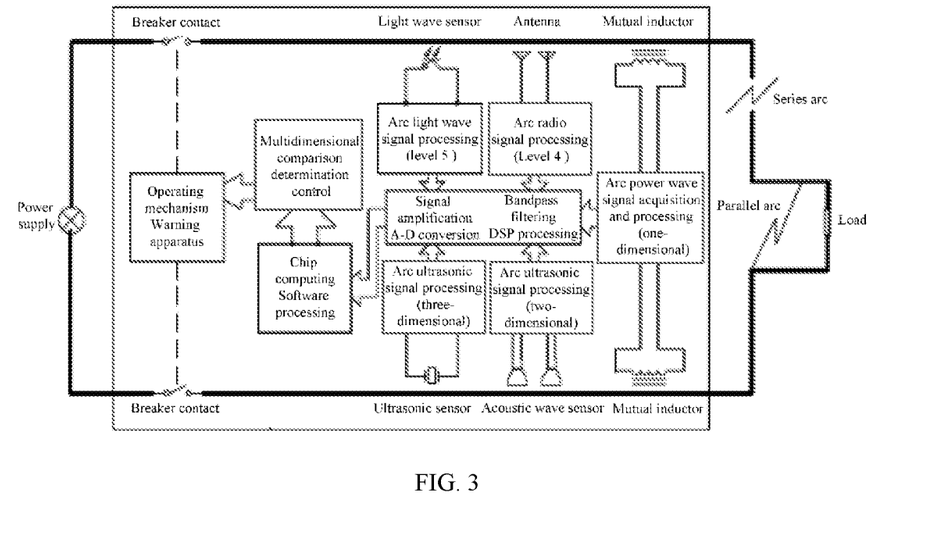
FIG. 3 is a schematic diagram of a five-dimensional detection method for an arc fault detection apparatus provided by an embodiment of the present application.

FIG. 3 is a schematic diagram of a five-dimensional detection method for an arc fault detection apparatus provided by an embodiment of the present application. As shown in FIG. 3, the above electromagnetic wave detection module can include: an arc radio wave detection module. The arc radio wave detection module detects radio wave characteristics of the power line to be detected through an antenna, so that the data processing module determines whether the power line to be detected has a fault according to the arc radio wave characteristics and preset arc radio wave characteristics, the preset arc radio wave characteristics include preset arc radio wave spectrum characteristics, preset arc radio wave phase characteristics and preset arc radio wave amplitude characteristics.

When the arc fault occurs, the phenomenon of electrical breakdown and glow discharge will occur, according to the electromagnetic wave induction theory in physics, radio wave radiation phenomenon will inevitably occur when the phenomenon of electrical breakdown and glow discharge occur. Moreover, the radio wave radiation characteristic of the arc fault is unique, which has the characteristics of arc fault and is only possessed by arc fault. That is, the radio wave has unique spectrum characteristics, phase characteristics and amplitude characteristics of arc radio wave of the arc fault. Among them, the spectrum characteristics, phase characteristics and amplitude characteristics of arc radio wave can be measured when the arc fault occurs. Based on this, the application of radio detection technology can use radio receiving antenna, electronic circuit and hardware and software combined CPU technology to receive, process, calculate, compare and distinguish radio signals for the spectrum characteristics, phase characteristics and amplitude characteristics of specific arc radio wave of arc fault radiation, so as to complete the detection and judgment of arc fault. This is the basic working principle of the arc radio wave detection module.

Optionally, the above electromagnetic wave detection module can further include: an arc light wave detection module. The arc light wave detection module detects arc light wave characteristics of the power line to be detected through a light wave sensor, so that the data processing module determines whether the power line to be detected has a fault according to the arc light wave characteristics and preset arc light wave characteristics, the preset arc light wave characteristics include preset arc light wave spectrum characteristics, preset arc light wave phase characteristics and preset arc light wave amplitude characteristics.

When the arc fault occurs, electrical glow discharge phenomenon will occur, according to the principle of wave-particle duality of light in physics, light wave radiation phenomenon will inevitably occur when the electrical glow discharge phenomenon occurs. Moreover, the light wave radiation characteristic of the arc fault is unique, which has the characteristics of arc fault and is only possessed by arc fault. That is, the light wave has unique spectrum characteristics, phase characteristics and amplitude characteristics of arc light wave of the arc fault. Among them, the spectrum characteristics, phase characteristics and amplitude characteristics of the arc light wave can be measured when the arc fault occurs. Based on this, the application of light wave detection technology can use specially designed light wave sensor, electronic circuit and hardware and software combined CPU technology to receive, process, calculate, compare and distinguish light wave signals for spectrum characteristics, phase characteristics and amplitude characteristics of specific arc light wave of faulty arc radiation, so as to complete the detection and judgment of arc fault. This is the basic working principle of the arc light wave detection module.

In addition, the mechanical wave detection module can include: an arc ultrasonic wave detection module. The arc ultrasonic wave detection module detects arc ultrasonic wave characteristics of the power line to be detected through an ultrasonic sensor, so that the data processing module determines whether the power line to be detected has a fault according to the arc ultrasonic wave characteristics and preset arc ultrasonic wave characteristics, the preset arc ultrasonic wave characteristics include preset arc ultrasonic wave spectrum characteristics, preset arc ultrasonic wave phase characteristics and preset arc ultrasonic wave amplitude characteristics.

When arc fault occurs, the phenomenon of breakdown of insulating medium and electrode vibration will occur, according to the principle that vibrations generate mechanical waves in physical, the phenomenon of mechanical wave vibration and propagation will inevitably occur when the phenomenon of breakdown of insulating medium and electrode vibration occurs. Moreover, the characteristics of mechanical wave vibration and propagation of arc fault are unique, which has the characteristics of arc fault and is only possessed by arc fault. That is, the mechanical wave vibration and propagation has unique spectrum characteristics, phase characteristics and amplitude characteristics of arc ultrasonic wave of the arc fault. Among them, the spectrum characteristics, phase characteristics and amplitude characteristics of arc ultrasonic wave can be measured when the arc fault occurs. Based on this, the application of ultrasonic wave detection technology can use specially designed ultrasonic sensors, electronic circuits and hardware and software combined CPU technology to receive, process, calculate, compare and distinguish ultrasonic wave signals for spectrum characteristics, phase characteristics and amplitude characteristics of specific arc ultrasonic wave of mechanical wave vibration and propagation of arc faults, so as to complete the detection and judgment of arc fault. This is the basic working principle of the arc ultrasonic wave detection module.

In addition, the mechanical wave detection module can further include: an arc acoustic wave detection module. The arc acoustic wave detection module detects arc acoustic wave characteristics of the power line to be detected through an acoustic wave sensor, so that the data processing module determines whether the power line to be detected has a fault according to the arc acoustic wave characteristics and preset arc acoustic wave characteristics, the preset arc acoustic wave characteristics include preset arc acoustic wave spectrum characteristics, preset arc acoustic wave phase characteristics and preset arc acoustic wave amplitude characteristics.

When arc fault occurs, the phenomenon of breakdown of insulating medium and electrode vibration will occur, according to the principle that vibrations generate mechanical waves in physical, the phenomenon of mechanical wave vibration and propagation will inevitably occur when the phenomenon of breakdown of insulating medium and electrode vibration occur. Moreover, the characteristics of mechanical wave vibration and propagation of arc fault are unique, which has the characteristics of arc fault and is only possessed by arc fault. That is, the mechanical wave vibration and propagation has unique spectrum characteristics, phase characteristics and amplitude characteristics of arc acoustic wave of the arc fault (including infrasound wave). Among them, the spectrum characteristics, phase characteristics and amplitude characteristics of arc acoustic wave can be measured when the arc fault occurs. Based on this, the application of acoustic wave detection technology can use specially designed acoustic wave sensors (including infrasound wave), electronic circuits and hardware and software combined CPU technology to receive, process, calculate, compare and distinguish acoustic wave signals for spectrum characteristics, phase characteristics and amplitude characteristics of specific arc acoustic wave of mechanical wave vibration and propagation of arc faults, so as to complete the detection and judgment of arc fault. This is the basic working principle of the arc acoustic wave detection module.

The detection sensors, signal acquisition, frequency selection filtering and processing and transmission thereof in each module of the above embodiments all operate independently, and then the signals processed by each module are transmitted to the central CPU of the system for multiple inspection and comprehensive calculation, and the final determination is given whether arc faults occur.

In addition, the above five-dimensional arc fault detection scheme can also be used in any combination according to the user's actual application scenario of arc fault protection, such as three-dimensional detection method (power wave+ultrasonic wave+radio wave) scheme, four-dimensional detection method (power wave+ultrasonic wave+radio wave+light wave) scheme, five-dimensional detection method (power wave+acoustic wave+ultrasonic wave+radio wave+light wave) scheme, etc., the purpose is to reduce the misjudgment rate and improve reliability, while taking into account economy and practicality. And for the specific combination method, it is not specified in this embodiment, and it should be understood that any combination method is within the recorded scope of the present application scheme, and will not be listed here.

In summary, the arc fault detection apparatus and scheme provided in this embodiment adopt the five-dimensional detection method, involving the power wave detection method, the mechanical wave (acoustic wave and ultrasonic wave) detection method and the electromagnetic wave (radio wave and light wave) detection method. In addition to the power wave detection method, the mechanical wave (acoustic wave and ultrasonic wave) detection method and the electromagnetic wave (radio wave and light wave) detection method are also adopted simultaneously, so as to achieve accurate arc measurement by means of five-dimensional detection, and further restore the arc fault characteristics completely to eliminate the arc fault misjudgment rate and achieve accurate judgment to improve the accuracy and reliability of arc fault detection.

In addition, an embodiment of the present application also provides an arc fault detection device including: a memory and at least one processor;

the memory stores computer-executed instructions;

the at least one processor executes the computer-executed instructions stored in the memory to enable the at least one processor to execute a corresponding arc fault detection method.

Furthermore, an embodiment of the present application provides a computer program product, including a computer program, when the computer program is executed by a processor, a corresponding arc fault detection method is implement.

The above arc fault detection method includes: detecting the electric energy characteristics and arc energy characteristics of the power line to be detected; and determining whether the power line to be detected has a fault according to the electric energy characteristics, preset electric energy characteristics, the arc energy characteristics and preset arc energy characteristics.

The person skilled in the art, after considering the specification and practicing the invention disclosed herein, will readily think of other implementation s of the present application. The present application is intended to cover any variation, use or adaptation of the present application that follow the general principles of the present application and includes common knowledge or customary techniques in the field of technology not disclosed in the present application. The specifications and embodiments are to be regarded as exemplary only, and the true scope and spirit of the present application are indicated by the claims below.

It should be understood that the present application is not limited to the precise structure already described above and shown in the attached drawings, and that various modifications and changes may be made without deviating from its scope. The scope of the present application is limited only by the attached claims.

What is claimed is:

1. An arc fault detection apparatus for a power line, comprising: a power wave detection module, an arc detection module, and a data processing module; wherein
    the power wave detection module is configured to detect electric energy characteristics of the power line to be detected,
    the arc detection module is configured to detect arc energy characteristics of the power line to be detected; and
    the data processing module is configured to determine whether the power line to be detected has a fault according to the electric energy characteristics and preset electric energy characteristics, the arc energy characteristics and preset arc energy characteristics, wherein
    the arc detection module comprises an electromagnetic wave detection module; wherein
    the electromagnetic wave detection module is configured to detect electromagnetic wave characteristics of the power line to be detected, so that the data processing module determines whether the power line to be detected has a fault according to the electromagnetic wave characteristics and preset electromagnetic wave characteristics, wherein
    the electromagnetic wave detection module comprises an arc radio wave detection module; wherein
    the arc radio wave detection module detects radio wave characteristics of the power line to be detected through an antenna, so that the data processing module determines whether the power line to be detected has a fault according to the arc radio wave characteristics and preset arc radio wave characteristics, the preset arc radio wave characteristics comprise preset arc radio wave spectrum characteristics, preset arc radio wave phase characteristics and preset arc radio wave amplitude characteristics, wherein
    the electromagnetic wave detection module further comprises an arc light wave detection module; wherein
    the arc light wave detection module detects arc light wave characteristics of the power line to be detected through a light wave sensor, so that the data processing module determines whether the power line to be detected has a fault according to the arc light wave characteristics and preset arc light wave characteristics, the preset arc light wave characteristics comprise preset arc light wave spectrum characteristics, preset arc light wave phase characteristics and preset arc light wave amplitude characteristics, wherein
    the arc detection module further comprises a mechanical wave detection module; wherein
    the mechanical wave detection module is configured to detect mechanical wave characteristics of the power line to be detected, so that the data processing module determines whether the power line to be detected has a fault according to the mechanical wave characteristics and preset mechanical wave characteristics, wherein
    the mechanical wave detection module comprises an arc ultrasonic wave detection module; wherein
    the arc ultrasonic wave detection module detects arc ultrasonic wave characteristics of the power line to be detected through an ultrasonic sensor, so that the data processing module determines whether the power line to be detected has a fault according to the arc ultrasonic wave characteristics and preset arc ultrasonic wave characteristics, the preset arc ultrasonic wave characteristics comprise preset arc ultrasonic wave spectrum characteristics, preset arc ultrasonic wave phase characteristics and preset arc ultrasonic wave amplitude characteristics, wherein
    the mechanical wave detection module further comprises an arc acoustic wave detection module; wherein
    the arc acoustic wave detection module detects arc acoustic wave characteristics of the power line to be detected through an acoustic wave sensor, so that the data processing module determines whether the power line to be detected has a fault according to the arc acoustic wave characteristics and preset arc acoustic wave characteristics, the preset arc acoustic wave characteristics comprise preset arc acoustic wave spectrum characteristics, preset arc acoustic wave phase characteristics and preset arc acoustic wave amplitude characteristics, wherein
    the power wave detection module,
    the electromagnetic wave detection module that includes the arc radio wave detection module and the arc light wave detection module, and
    the mechanical wave detection module that includes the arc ultrasonic wave detection module and the arc acoustic wave detection module
    are adopted simultaneously so as to achieve accurate arc measurement.

2. An arc fault detection method, applied to the arc fault detection apparatus according to claim 1, comprising the steps of:
    detecting electric energy characteristics and arc energy characteristics of a power line to be detected; and
    determining whether the power line to be detected has a fault according to the electric energy characteristics, preset electric energy characteristics, the arc energy characteristics and preset arc energy characteristics.

3. An arc fault detection device, comprising, a memory and at least one processor; wherein
   the memory stores computer-executed instructions; and
   the at least one processor executes the computer-executed instructions stored in the memory to enable the at least one processor to execute the arc fault detection method according to claim 2.

4. A non-transitory computer readable storage medium, wherein the computer readable storage medium stores computer-executed instructions, and when the processor executes the computer-executed instructions, the arc fault detection method according to claim 2 is implemented.

\* \* \* \* \*